United States Patent
Wu et al.

[15] 3,679,702
[45] July 25, 1972

[54] 1-[2-AMINO-A-(3-INDOLYL PHENETHYL]-2-PYRROLIDINONE

[72] Inventors: Yao Hua Wu; Richard P. Ryan, Jr., both of Evansville, Ind.

[73] Assignee: Mead Johnson & Company, Evansville, Ind.

[22] Filed: March 12, 1971

[21] Appl. No.: 123,852

[52] U.S. Cl. .................260/326.14 R, 260/326.15, 424/274
[51] Int. Cl. .......................................................C07d 27/56
[58] Field of Search ..........................................260/326.14 R

[56] References Cited

UNITED STATES PATENTS 3,203,961   8/1965   Wu....................................260/326.14

Primary Examiner—Alex Mazel
Assistant Examiner—Joseph A. Narcavage
Attorney—Robert E. Carnahan and Robert H. Uloth

[57] ABSTRACT

1-[2-Amino-α-(3-indolyl)phenethyl]-2-pyrrolidinone is a new synthetic compound having pharmacological value as a diuretic agent and as a chemical intermediate in the preparation of other diuretics and azo dyestuffs. This substance is prepared by basic hydrolysis of 2,3,5,6-tetrahydro-5-(indol-3-yl)-1H-pyrrolo[2,1-b][1,3]benzodiazepine.

3 Claims, No Drawings

1-[2-AMINO-A-(3-INDOLYL PHENETHYL]-2-PYRROLIDINONE

SUMMARY OF THE INVENTION

This invention is concerned with the novel organic compound 1-[2-amino-α-(3-indolyl)phenethyl]-2-pyrrolidinone which has the formula depicted below and toxic pharmaceutically acceptable salts thereof.

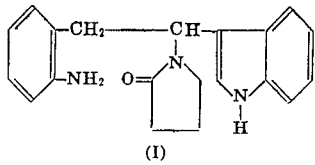

(I)

This substance is useful as a diuretic agent and as a chemical intermediate in the preparation of other diuretics and chemicals such as azo dyestuffs.

1-[2-Amino-α-(3-indolyl)phenethyl]-2-pyrrolidinone is a basic substance which is practically insoluble in water but usually fairly and readily soluble in most organic solvents. Non-toxic pharmaceutically acceptable acid addition salts of 1-[2-amino-α-(3-indolyl)phenethyl]-2-pyrrolidinone can be prepared by dissolving the base in an organic solvent such as 1,2-dichloroethane or ethanol and mixing the acid therewith. Illustrative of suitable acids which may be used are sulfuric, phosphoric, hydrochloric, hydrobromic, hydroiodic, sulfamic, methanesulfonic, benzenesulfonic, para-toluenesulfonic, acetic, lactic, succinic, maleic, mucic, tartaric, citric, gluconic, benzoic, cinnamic, isethionic and related acids.

In accordance with this invention the process employed for the preparation of 1-[2-amino-α-(3-indolyl)phenethyl]-2-pyrrolidinone (I) involves basic hydrolysis of 2,3,5,6-tetrahydro-5-(indol-3-yl)-1H-pyrrolo[2,1-b][1,3]benzodiazepine (II).

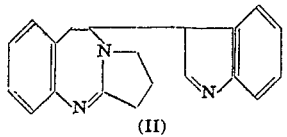

(II)

The reaction is preferably carried out in a protic solvent such as ethanol employing an alkali metal base such as potassium hydroxide. Other chemical methods for the preparation of 1-[2-amino-α-(3-indolyl)phenethyl]-2-pyrrolidinone will be apparent to those skilled in the art.

Starting material (II) is obtained by reacting 2-(3-indolyl)indoline with 2-pyrrolidinone in the presence of phosphorus oxychloride in an inert aprotic solvent to provide 2-(3-indolyl)-1-[2-(1-pyrrolinyl)]indole which on heating or refluxing in alcohol for a period of time rearranges to 2,3,5,6-tetrahydro-5-(indol-3-yl)-1H-pyrrolo[2,1-b][1,3]-benzodiazepine. Preparation of 2,3,5,6-tetrahydro-5-(indol-3-yl)-1H-pyrrolo[2,1-b][1,3]benzodiazepine is described in U.S. copending application Ser. No. 004,108.

In accord with the present invention, it has been discovered that 1-[2-amino-α-(3-indolyl)phenethyl]-2-pyrrolidinone is a diuretic agent. For example, 1-[2-amino-α-(3-indolyl)phenethyl]-2-pyrrolidinone produces substantially increased urine flow, sodium, and chloride ion excretion in the rat as demonstrated by the assay of W. L. Lipschitz et al., *J. Pharmacol. Expt. Therap.*, 79, 97 (1943). Along with the enchancement of the urinary excretion of water, there is a selective elimination of sodium ion with respect to potassium ion. According to the Lipschitz assay, oral administration of 1-[2-amino-α-(3-indolyl)phenethyl]-2-pyrrolidinone to the rat at a dose of 25 milligram per kilogram body weight when compared to a urea control group affords ratios of 1.27 for volume excretion, 1.10 for sodium ion excretion, 0.80 for potassium ion excretion and 1.06 for chloride ion excretion. These values compare favorably with hydrochlorothiazide, a well known diuretic agent, which at a dose of 24 milligram per kilogram affords ratios of 1.46 for volume excretion, 1.63 for sodium ion excretion, 1.05 for potassium ion excretion and 1.75 for chloride ion excretion.

1-[2-Amino-α-(3-indolyl)phenethyl]-2-pyrrolidinone and non-toxic pharmaceutical salts thereof may be administered to mammals in an effective diuretic dose orally or parenterally alone or in combination with standard pharmaceutically acceptable carriers. The usual recommended dose is from 0.1 to 25 mg./kg. of body weight per day although lesser or greater quantities may be used.

Apart from its diuretic action, 1-[2-amino-α-(3-indolyl)phenethyl]-2-pyrrolidinone is useful as a chemical intermediate in the synthesis of 2,3,5,6-tetrahydro-5-(indol-3-yl)-1H-pyrrolo[2,1-b][1,3]benzodiazepine which is an orally active diuretic agent. Conversion of 1-[2-amino-α-(3-indolyl)-phenethyl]-2-pyrrolidinone to 2,3,5,6-tetrahydro-5-(indol-3-yl)-1H-pyrrolo[2,1-b][1,3]benzodiazepine is carried out by cyclodehydration employing a reagent such as phosphorus oxychloride, thionyl chloride, or phosphorus pentachloride in an inert reaction solvent. This conversion is also of interest with respect to manufacture of 2,3,5,6-tetrahydro-5-(indol-3-yl)-1H-pyrrolo[2,1-b][1,3]benzodiazepine since loses thereof due to hydrolysis to 1-[2-amino-α-(3-indolyl)-phenethyl]-2-pyrrolidinone may be recovered by means of it.

1-[2-Amino-α-(3-indolyl)phenethyl]-2-pyrrolidinone is of value in the preparation of dyes inasmuch as the amino moiety can be diazotized and coupled with phenolic compounds to produce azo dyestuffs.

The following examples serve to illustrate the invention.

DESCRIPTION OF THE SPECIFIC EMBODIMENTS

Example 1. Preparation of 1-[2-amino-α-(3-indolyl)-phenethyl]-2-pyrrolidinone.

A mixture of 2-(3-indolyl)indoline (23.4 g., 0.1 mole) and 2-pyrrolidinone (17.02 g., 0.2 mole) in 150 ml. of 1,2-dichloroethane is treated with a solution of phosphorus oxychloride (15.33 g., 0.1 mole) in 50 ml. of 1,2-dichloroethane in one lot. The reaction is exothermic and the temperature rises to about 54° C. initially and then returns to room temperature. After a reaction period of about 1 hr., the mixture is cooled to ice temperature and then poured into 300 ml. of concentrated aqueous ammonium hydroxide (29 percent) containing 100 g. of crushed ice with stirring. The clear aqueous layer is separated, washed once with 100 ml. of 1,2-dichloroethane and the combined 1,2-dichloroethane solutions are dried over anhydrous magnesium sulfate. After drying, the solution is concentrated to a thick residue which is dissolved in 150 ml. of 80 percent ethanol This solution is concentrated by boiling on a steam bath for about 1 hr. and permitting the solvent to evaporate until crystallization commences. During this concentration step, the rearrangement of 2-(3-indolyl)-1-[2-*1-pyrrolinyl)]indoline to 2,3,5,6-tetrahydro-5-(indol-3-yl)-1H-pyrrolo[2,1-b][1,3 benzodiazepine occurs. After crystallization is complete the solid is collected; yield 13.4 g., (45 percent), m.p. 234°–238° C. Crystallization of this material from absolute ethanol provides analytically pure 2,3,5,6-tetrahydro-5-(indol-3-yl)-1H-pyrrolo[2,1-b][1,3]- benzodiazepine, m.p. 234°–236° C Dec.

2,3,5,6-Tetrahydro-5-(indol-3-yl)-1H-pyrrolo [2,1-b][1,3] benzodiazepine hydrochloride prepared by the addition of ethanolic hydrogen chloride to the free base from in ethanol and the dilution with ether has a melting point of 262°–64° C.

A mixture of 5 g. of 2,3,5,6-tetrahydro-5-(indol-3-yl)-1H-pyrrolo[2,1-b][2,1-b,[1,3]benzodiazepine hydrochloride in 500 ml. of 95 percent ethanol and 50 ml. of 56 percent aqueous potassium hydroxide is refluxed for 12 hr. The resulting clear yellow solution concentrated in vacuo provides a residual solid which is stirred with water and filtered. The dried filter cake is stirred with 80 ml. of warm acetone and filtered to remove insoluble material which is recovered 2,3,5,6-tetrahydro-5-(indol-3-yl)-1H-pyrrolo[2,1-b][1,3 ]benzodiazepine. Concentration from ethyl acetate affords 2.2 g. (41 percent yield) 1-[2-amino-α-(3-indolyl)phenethyl]-2-pyrrolidinone, m.p. 184.5°–186.5° C.

Analysis. Calcd. for $C_{20}H_{21}N_3O$: C, 75.21; H, 6.63; N, 13.16. Found: C, 75.02; H, 6.62; N, 12.94.

Primary infrared absorption maxima of this material (5 percent in potassium bromide) occur at 3,400, 3,240, and 1,660 reciprocal centimeters which correspond respectively to characteristic NH, $NH_2$ and $CONR_2$ frequencies.

The nuclear magnetic resonance spectrum of 1-[2-amino-α-(3-indolyl)phenethyl]-2-pyrrolidinone measured on a 10 percent solution in deuterochloroform with tetramethylsilane as reference has the following characteristics: delta, 1.7 to 3.14 (8), 4.2 (broad singlet, 2, $ArNH_2$), 5.83 (triplet, 1, J equals $8H_z$, C—H), 6.5 to 7.7 (9) 9.48 (broad singlet, 1, indole N—H).

Mass spectrum (40 ev) characteristics are: m/e (relative intensity) 319 (2.3), 233 (13), 214 (28), 213 (100).

1-[2-Amino-α-(3-indolyl)phenethyl]-2-pyrrolidinone hydrochloride is obtained by dissolving the base in ethanol and adding ethanolic hydrogen chloride thereto.

Example 2. Preparation of 2,3,5,6-tetrahydro-5-(indol-3-yl)-1H-pyrrolo[2,1-b][1,3 benzodiazepine from 1-[2-amino-α-(3-indolyl)phenethyl]-2-pyrrolidinone.

Phosphorus oxychloride (0.23 g., 1.56 mmole) is added to a mixture of 1-[2-amino-α-(3-indolyl)phenethyl]-2-pyrrolidinone (0.5 g., 1.56 mmole) and triethylamine (0.16 g., 1.56 mmole) in dichloroethane (15 ml.) at 0–5° C. This mixture is stirred for 16 hr. and then hydrolyzed with 6N aqueous ammonium hydroxide. The hydrolyzed mixture is filtered, the aqueous layer separated, and the dichloroethane layer concentrated in vacuo to provide 0.48 g. of white residual solid. The solid is extracted with boiling isopropyl ether. The residue remaining after the isopropyl ether treatment and a small amount (0.05 g.) of solid which precipitates from the isporopyl ether extract are combined affording 0.34 g. (72 percent yield) of crude 2,3,5,6-tetrahydro-5-(indol-3-yl)-1H-pyrrolo[2,1-b][1,3]- benzodiazepine. The infrared of this material corresponds to the infrared of 2,3,5,6-tetrahydro-5-(indol-3-yl)-1H-pyrrolo-[2,1-b][1,3 benzodiazepine prepared in Example 1. Crystallization of this material from ethanol provides 2,3,5,6-tetrahydro-5-(indol-3-yl)-1H-pyrrolo[2,1-b][1,3]benzodiazepine which does not depress the melting point of an authentic sample of 2,3,5,6-tetrahydro-5-(indol-3-yl)-1H-pyrrolo[2,1-b][1,3]-benzodiazepine and has an infrared consistent therewith.

Example 3. 4-Hydroxy-2'-[2-(3-indolyl)-2-(2-oxo-1-pyrrolidinyl)ethyl]azobenzene.

Concentrated hydrochloric acid (0.8 ml.) is slurried with 1-[2-amino-α-(3-indolyl)-phenethyl]-2-pyrrolidinone (1.0 g., 31 mmole) in a water-ice mixture and a cold solution of sodium nitrite added thereto. The mixture is stirred until no nitrous acid is detected with starch-iodide paper and an aqueous mixture of phenol (0.29 g., 31 mmole) and 1.5 ml. of 40 percent sodium hydroxide then added. A golden orange solid is thus obtained which crystallized from benzene and a trace of methanol yields analytically pure 4-hydroxy-2'-[2-(3-indolyl)2-(2-oxo-1-pyrrolidinyl)ethyl]-azobenzene, m.p. 207°–209° C.

Analysis. Calcd. for $C_{26}H_{24}N_4O_2$: C, 73.56; H, 5.70; N, 13.20. Found: C, 73.38; H, 5.55; N, 13.12.

What is claimed is:

1. A compound selected from the group consisting of 1-[2-amino-α-(3-indolyl)phenethyl]-2-pyrrolidinone and non-toxic pharmaceutically acceptable salts thereof.

2. The compound of the group defined in claim 1 which is 1-[2-amino-α-(3-indolyl)phenethyl]-2-pyrrolidinone.

3. The compound of the group defined in claim 1 which is 1-[2-amino-α-(3-indolyl)phenethyl]-2-pyrrolidinone hydrochloride.

* * * * *